(12) United States Patent
Natanzon et al.

(10) Patent No.: US 8,954,673 B1
(45) Date of Patent: Feb. 10, 2015

(54) USING A CONDITIONAL READ REQUEST AND A HASH TO DETERMINE SYNCHRONIZATION OF DATA IN A CACHE AT A HOST WITH DATA IN STORAGE ARRAY

(75) Inventors: Assaf Natanzon, Tel Aviv (IL); Zvi Gabriel BenHanokh, Tel Aviv (IL); Felix Shvaiger, Netanya (IL)

(73) Assignee: EMC International Company, Hamilton (BM)

( * ) Notice: Subject to any disclaimer, the term of this patent is extended or adjusted under 35 U.S.C. 154(b) by 438 days.

(21) Appl. No.: 13/424,402

(22) Filed: Mar. 20, 2012

(51) Int. Cl.
*G06F 13/00* (2006.01)
(52) U.S. Cl.
USPC .............................................. 711/118; 714/52
(58) Field of Classification Search
CPC ............ G06F 12/0866; G06F 11/1004; G06F 11/1662; G06F 11/1666
USPC ............................................ 711/118; 714/52
See application file for complete search history.

(56) References Cited

U.S. PATENT DOCUMENTS

| 5,734,898 | A  | * | 3/1998 | He | 1/1 |
| 2009/0006763 | A1 | * | 1/2009 | Carr et al. | 711/140 |
| 2010/0095053 | A1 | * | 4/2010 | Bruce et al. | 711/103 |
| 2014/0201258 | A1 | * | 7/2014 | Jowett et al. | 709/203 |

* cited by examiner

*Primary Examiner* — Hong Kim
(74) *Attorney, Agent, or Firm* — Daly, Crowley, Mofford & Durkee, LLP

(57) ABSTRACT

In one aspect, a method includes sending a conditional read request from a host to a storage array requesting data in a data block stored at the storage array. The conditional read request includes a first hash of data in the data block at the host. The method also includes determining a second hash of the data in the data block stored at the storage array, comparing the first hash and the second hash, sending a reply from the storage array to the host with the data in the data block stored at the storage array if the first hash and the second hash differ and sending a reply from the storage array to the host without the data in the data block stored at the storage array if the first hash and the second hash are the same.

17 Claims, 6 Drawing Sheets

USING A CONDITIONAL READ REQUEST AND A HASH TO DETERMINE SYNCHRONIZATION OF DATA IN A CACHE AT A HOST WITH DATA IN STORAGE ARRAY

BACKGROUND

Today flash memory prices are relatively inexpensive. With these low flash memory prices, a host in open-systems can maintain local caching of disk data at a local flash device to save disk accesses. In many cases the local cache at the host is not synchronized with the storage disk because other hosts may be writing to the storage disk, or due to a failure. The host may use one of two methods to handle the potentially unsynchronized data. A first method involves designing and maintaining a fully synchronized cache using a cluster code. A second method involves performing a blind read of the local cache.

SUMMARY

In one aspect, a method includes sending a conditional read request from a host to a storage array requesting data in a data block stored at the storage array. The conditional read request includes a first hash of data in the data block at the host. The method also includes determining a second hash of the data in the data block stored at the storage array, comparing the first hash and the second hash, sending a reply from the storage array to the host with the data in the data block stored at the storage array if the first hash and the second hash differ and sending a reply from the storage array to the host without the data in the data block stored at the storage array if the first hash and the second hash are the same.

In another aspect, a host includes at least one processor configured to send a conditional read request to a storage array requesting data in a data block stored at the storage array, receive a reply from the storage array with the data in the data block stored at the storage array if a first hash of data in the data block at the host and a second hash of the data in the data block at the storage array differ and receive a reply from the storage array without the data in the data block stored at the storage array if the first hash and the second hash are the same. The conditional read request includes the first hash.

In a further aspect, a storage array includes at least one processor configured to receive a conditional read request from a host requesting data in a data block stored at the storage array, send a reply to the host with the data in the data block stored at the storage array if a first hash of data in the data block at the host and a second hash of the data in the data block at the storage array differ and send a reply to the host without the data in the data block stored at the storage array if the first hash and the second hash are the same. The conditional read request includes the first hash.

DETAILED DESCRIPTION

Described herein are techniques to determine if local data is synchronized with data in a storage array using a conditional read request (also referred to as a "conditional read command" or simply as a "conditional read"). In one example, the techniques determine if a memory cache of a host is synchronized with a storage array using the conditional read request after the host loses contact with the storage array, for example, during a disaster. In another example, the host is part of a cluster of other hosts accessing the same storage array. The techniques described herein use the conditional read to allow the host to determine whether its local memory cache is synchronized or is no longer synchronized because of writes performed by the other hosts in the cluster.

A conditional read is a vendor-specific SCSI command which receives as an input an LBA (Logical Block Address), a number of blocks and a hash value. A storage array, for example, compares the hash value to the hash value of the data stored in the LBA with the size indicated. The behavior of a conditional read request is described herein, for example, with respect to FIG. 2. The conditional read command may be used to save bandwidth between a host and a storage array, and thus, improve performance.

Figure 1A:
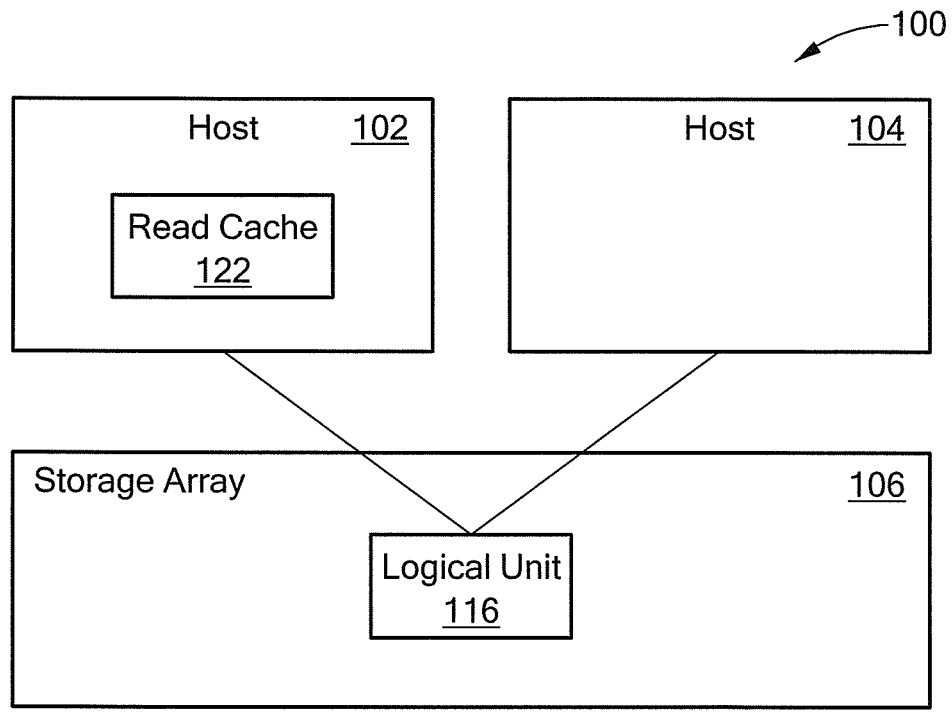
FIG. 1A is a block diagram of another example of a system to determine synchronization of a memory cache at a host with a storage array with other hosts accessing the storage.

Referring to FIG. 1A, data synchronization can be performed in various type systems and configurations such as, for example, a system 100. The system 100 includes hosts (e.g., a host 102, a host 104) and each host accesses the logical unit 116 of the storage array 106. The host 102 includes a read cache 122 that stores read data that the host 102 read from the logical unit 116. In one example, only one host (e.g., the host 102) controls the logical unit (e.g., the storage array 116) at a time; and, thus, the cache is valid only as long as the host controls the storage array. In another example, the host 104 may also make writes to the logical unit 116 so that the read cache 122 at the host 102 may be invalid. As will be further described herein, a conditional read is used for every I/O to synchronize the read cache 122 with the logical unit 116. In other examples, the conditional read works for volatile memory (RAM) as well as a cache which is persistent.

Figure 1B:
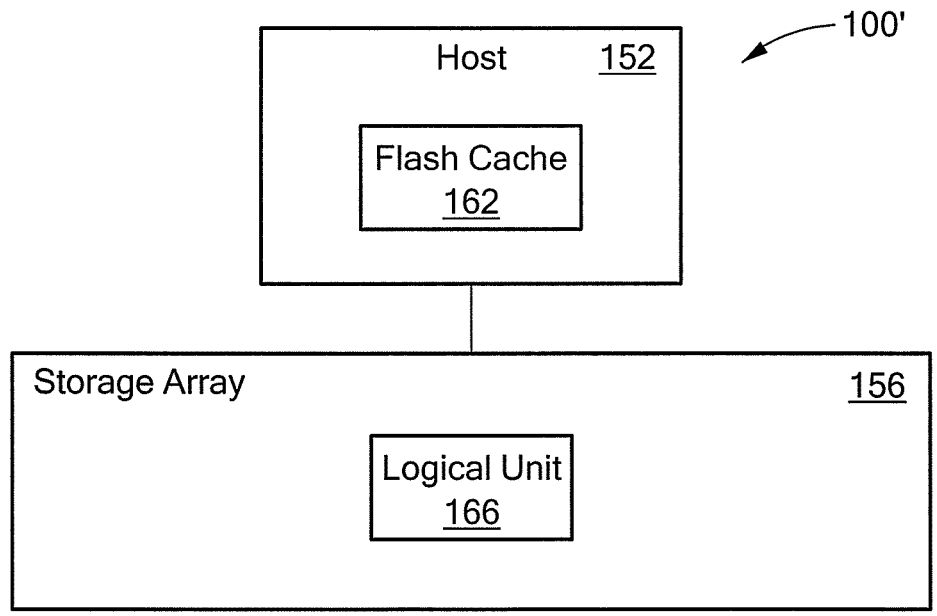
FIG. 1B is a block diagram of an example of a system to determine synchronization of a memory cache at a host with a storage array.

Referring to FIG. 1B, data synchronization can be performed in other systems and configurations such as, for example, a system 100'. The system 100' includes a host 152 that accesses a logical unit 166 on a storage array 156. The host includes a flash cache 162. In one example, during a disaster, or if we work in a cluster and the host 152 loses the logical unit 166 and then regains access to the logical unit 166, it is unclear whether the flash cache 162 is valid. For locations which are not valid a synchronization process using conditional reads updates the cache.

In another example of using a conditional read, data in the cache is written to the non-volatile flash device, but metadata is kept in a volatile RAM and the metadata is lost during a crash. In one particular example, the metadata is periodically saved persistently. After a crash the latest version of the metadata from the persistent store is read, but the data is not valid. The conditional read is used for every location in the cache because it is unclear whether the data, which is written in the cache can be used. This may happen since the metadata is not fully updated. Thus, the metadata may indicate that the data in the flash cache is valid, but it is, in fact, no longer valid.

In a further example of using a conditional read, a host is in a cluster and loses access to the storage array so the host cannot access the disk and the disk changes since another host has taken control of the storage device. If the host re-gains connection to the storage array, a conditional read is performed from the storage array in order to make the cache valid for each read because there may be an older version of the data in the cache.

Figure 2:
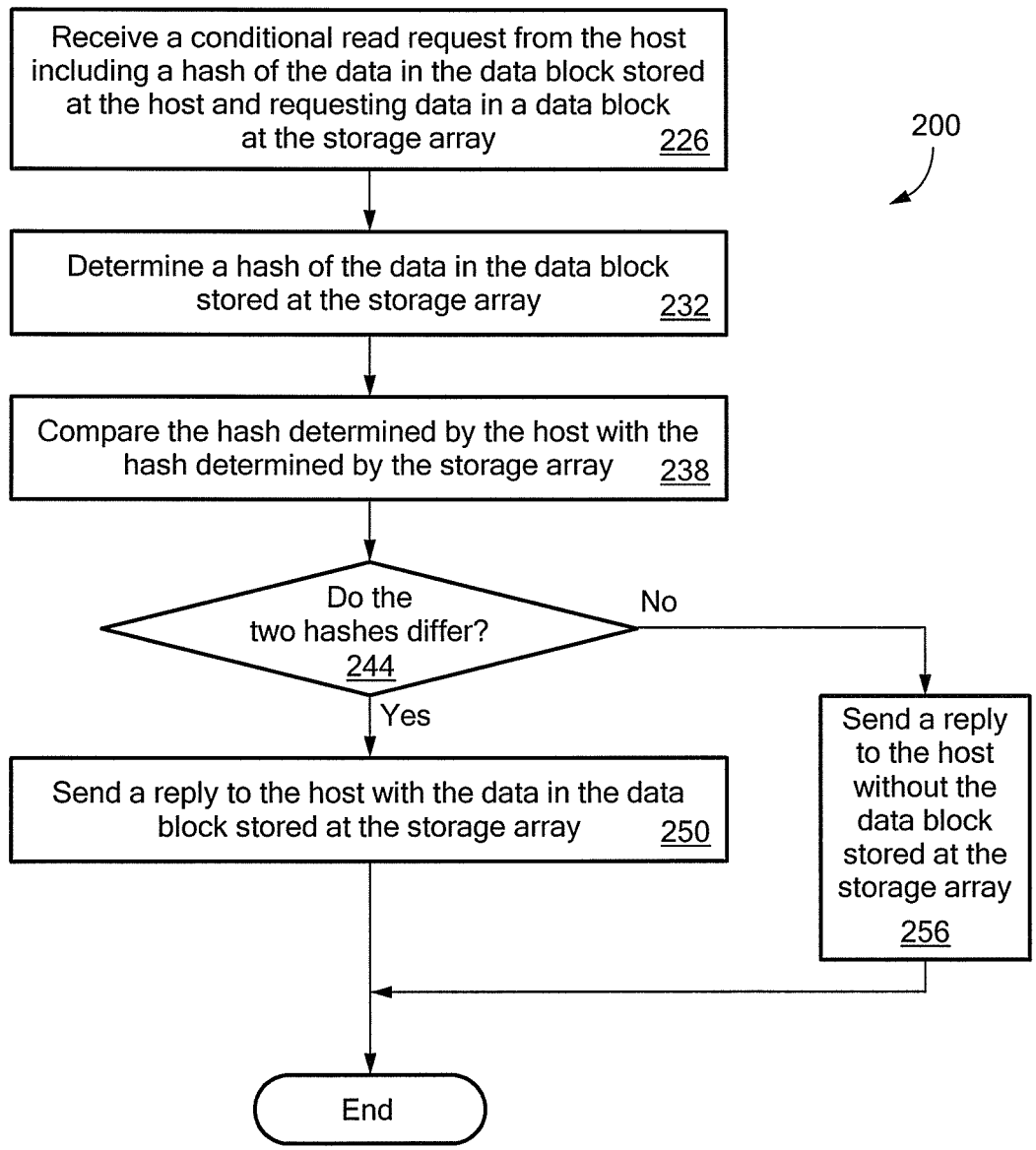
FIG. 2 is a flowchart of an example of a process to determine synchronization of the memory cache at the host with the storage array performed at the storage array.

Referring to FIG. 2, one example of a process to determine synchronization of a memory cache at a host with a storage array is a process 200. Process 200 receives a conditional read request from the host including the hash of the data in the data block stored at the host and requesting data in the data block at the storage array (226). Process 200 determines a hash of data in the data block stored at the storage array (232) and compares the hash determined by the host with the hash determined by the storage array (238). The storage array may calculate the hash for the requested data at this time or have it already stored from previous calculation.

Process 200 determines if the two hashes differ (244). Process 200 sends a reply to the host with data in the data block stored at the storage array 108 if the two hashes differ (250). For example, if the two hashes are different, then the memory cache is not synchronized with the storage array 108. For example, the data block has been overwritten by another host. Thus, the host 102a cannot use the data corresponding to this particular data block from its memory cache 112a.

Process 200 sends a reply to the host without data in the data block stored at the storage array 108 if the two hashes are the same (256). For example, if the two hashes are the same then the memory cache is synchronized with the storage array for this particular data block.

Figure 3:
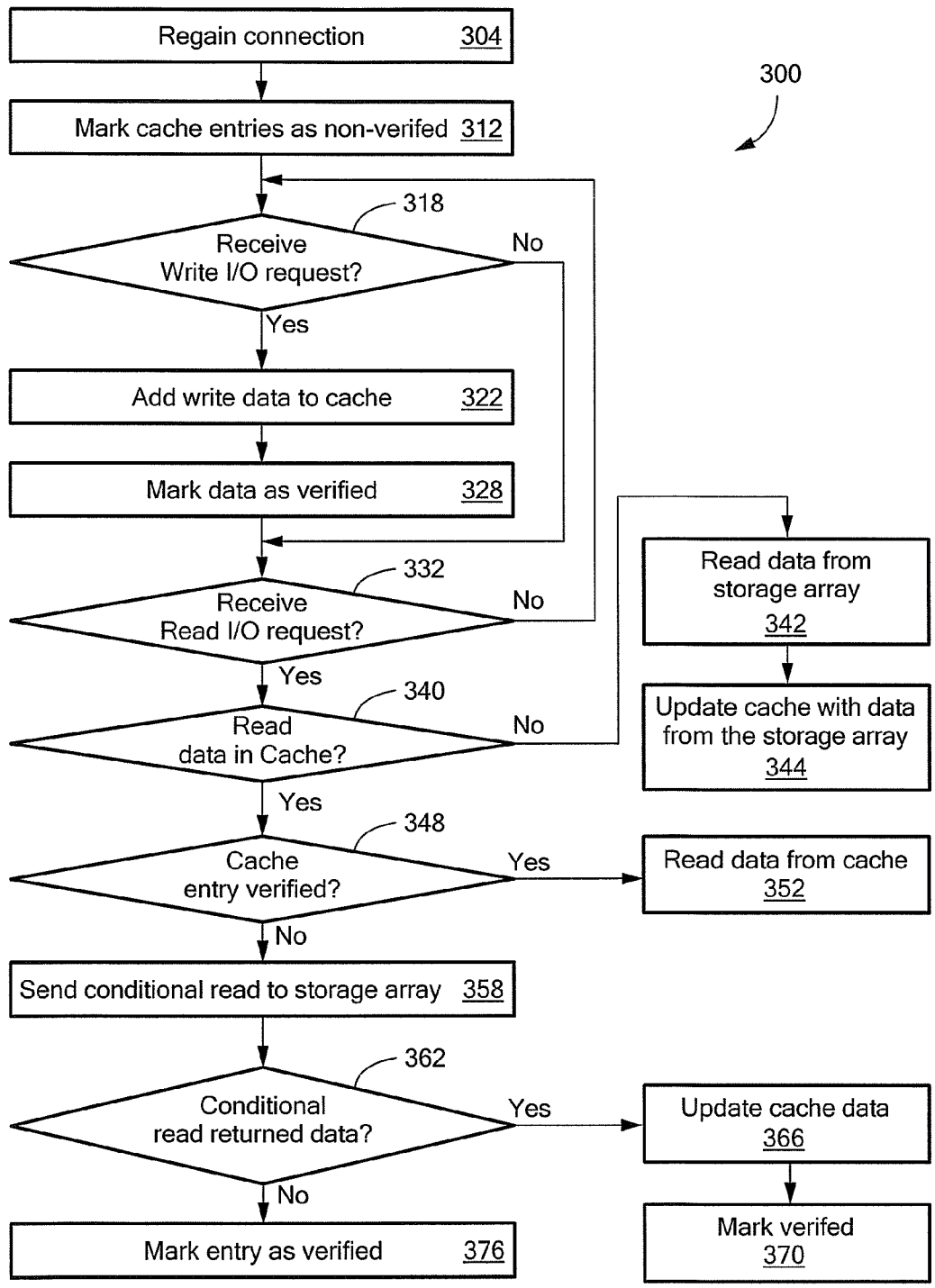
FIG. 3 is a flowchart of an example of a process using a conditional read in a multiple host environment but only one host may access a storage array at a time.

Referring to FIG. 3, an example of a process to use conditional reads to synchronize a local cache with a storage array with multiple hosts and only one host can control the storage array at a time, as shown in FIG. 1A, is a process 300. When the host 102 regains control of the logical unit 116 (304), the host 102 marks entries in the cache 122 as non-verified. The host 102 determines if a write I/O request is received (318) and if a write I/O request is received the write data is added to the cache 122 (322) and the data block is marked as verified (328).

The host 102 determines if a read I/O request is received (332) and if a read I/O request is received, determines if read data is in the cache 122 (340). If the read data is not in the cache 122, data is read from the storage array (342) and updating the cache with the data from the storage array (344).

If the read data is in the cache 122, the host 102 determines if the entry for the cache 122 is verified (348) and if the entry in the cache 122 is verified, the data is read from the cache 122 (352).

If the read data in the cache 122 is not verified, the host sends a conditional read to the storage array 106 (358). For example, the processing block 226 in FIG. 2 receives the conditional read. After process 200 is performed, the storage array 106 sends a reply back to the host 102.

The host 102 determines if the conditional read returned data (362). If the conditional read returns data (i.e., the storage array 106 and the memory cache 122 are not synchronized), the host 102 updates the data block in the cache 122 with the new data and marks the entry corresponding to the data block as verified (370). If the conditional read does not return any data (i.e., the storage array 106 and the memory cache 122 are synchronized), the host 102 marks the corresponding entry in the memory cache 122 as verified (376).

Figure 4:
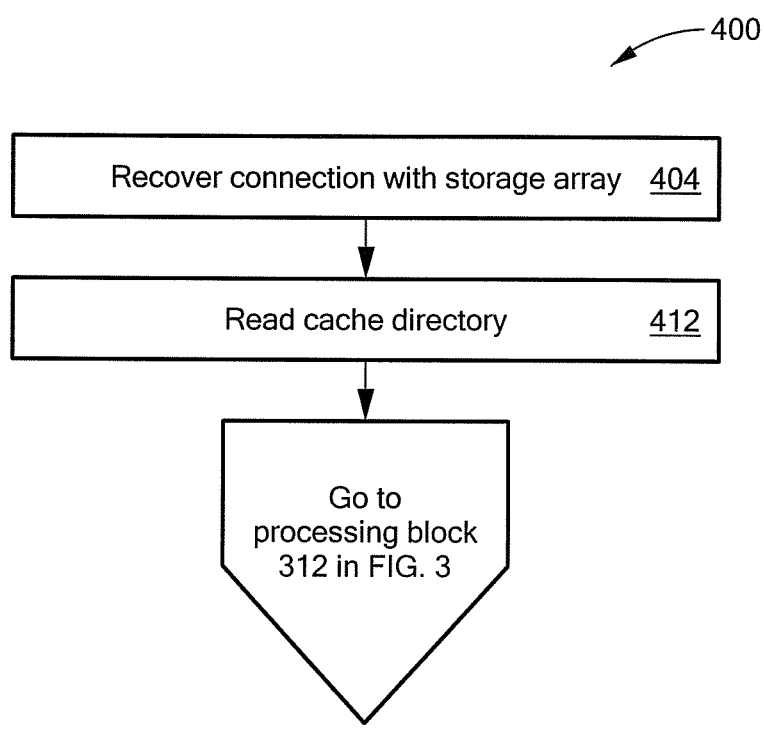
FIG. 4 is a flowchart of an example of a process using a conditional read in a cache warming.

Referring to FIG. 4, in other examples, such as in FIG. 1B, the host 152 crashes or becomes disconnected from the storage array 156. An example of a process to synchronize the flash cache 162 with the logical unit 166 is a process 400. After the host 152 recovers a connection with the storage array 156 (404), process 400 reads a cache directory (not shown) (412). The cache directory is the metadata of the cache which indicates which data is in the flash cache and the data validity, i.e. what data is cached at each location of the flash device. The cache directory may be kept in volatile memory to improve performance, and is lost during a failure. In order to allow recovery of the cache, a snapshot of the cache directory may be saved to the non-volatile flash cache periodically. At recovery the snapshot is read, but after a failure an image of the cache directory would not be completely updated. In order to ensure that the cache entries in the cache directory are indeed valid, process 200 goes to processing block 312 in FIG. 3.

Figure 5:
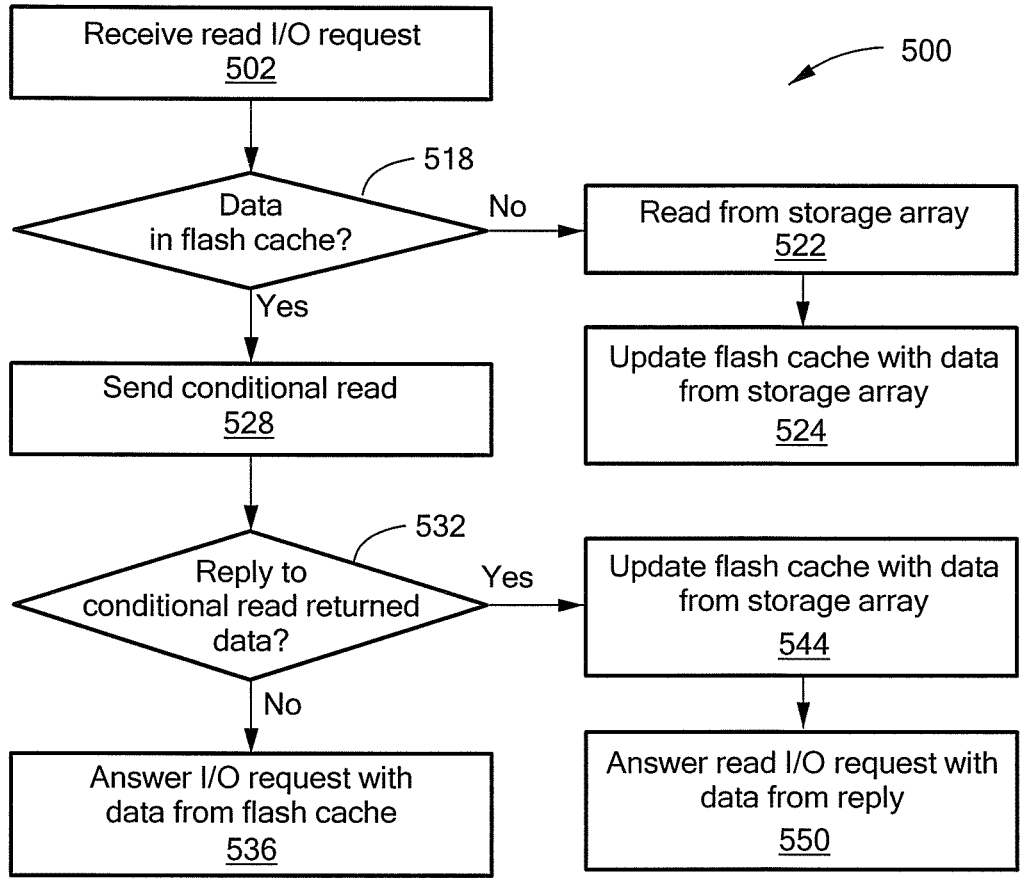
FIGS. 5 and 6 are flow charts of examples of processes performed when multiple hosts can access a storage array.
Figure 6:
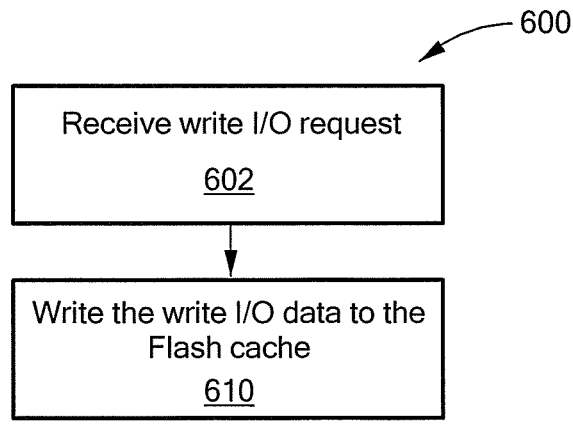

FIGS. 5 and 6 describe processes performed when a read I/O request or a write I/O request is received in a multiple host environment when multiple hosts can access a storage array at the same time, for example as shown in FIG. 1B.

Referring to FIG. 5, in a process 500, the host 152 receives a read I/O request (502) and determines if the data is in the flash cache 162 (518). If the data is not in the flash cache 162, the host 152 reads the data from the storage array 156 (522) and updating the flash cache 162 with the data from the storage array 156 (524).

If the data is in the flash cache 162, the host 152 sends a conditional read to the storage array 156 (528) and determines if the reply to the conditional read includes data (532).

The host 152 answers the read I/O request with data from the flash cache 162 if the reply does not include read data (i.e., the storage array and the flash cache 122 are synchronized), (536). If the reply includes read data (i.e., the storage array and the flash cache 122 are not synchronized), the host 152 updates the flash cache 162 with the read data from the reply (544) and answers the read with the read data from the reply (550).

Referring to FIG. 6, in a process 600, if the host 152 receives a write I/O request (602), then the host 152 writes I/O to the flash cache 162 (610).

Figure 7:
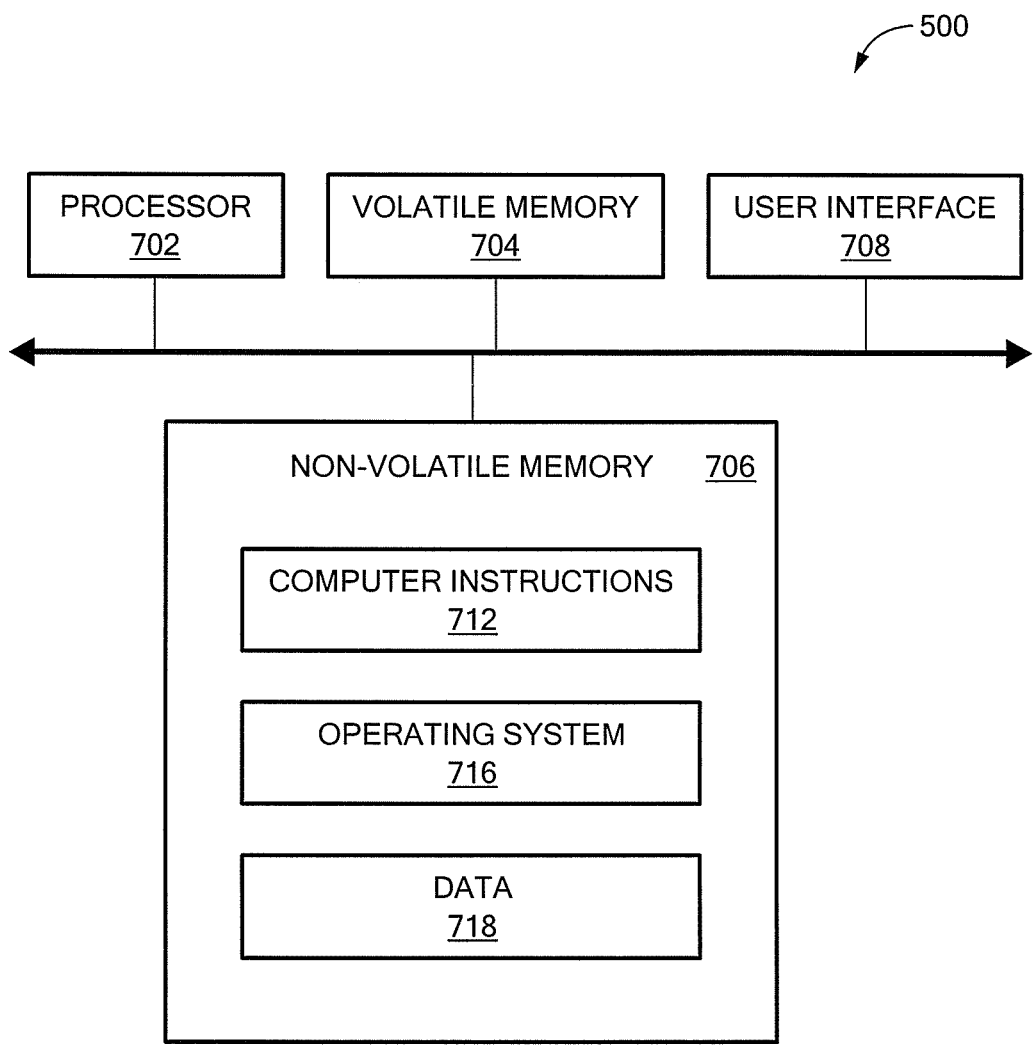
FIG. 7 is a block diagram of a computer on which the processes of FIGS. 2 to 6 may be implemented.

Referring to FIG. 7, an example of a computer to perform the process described herein is a computer 700. The computer 700 includes a processor 702, a volatile memory 704, a non-volatile memory 706 (e.g., hard disk) and a user interface (UI) 708 (e.g., a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., the processes 200 to 600).

The processes described herein (e.g., the processes 200 to 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200 to 600 are not limited to the specific processing order of FIGS. 2 to 6. Rather, any of the processing blocks of FIGS. 2 to 6 may be re-ordered, combined or removed, performed in parallel or in serial, as necessary, to achieve the results set forth above.

The processing blocks (for example, in the processes 200 to 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
   sending a conditional read request from a host to a storage array requesting data in a data block stored at the storage array, the conditional read request comprising a first hash of data in the data block at the host, wherein sending a conditional read request from a host to a storage array comprises sending a conditional read request from the host to a storage array that is accessed by other hosts;
   determining a second hash of the data in the data block stored at the storage array;
   comparing the first hash and the second hash;
   sending a reply from the storage array to the host with the data in the data block stored at the storage array if the first hash and the second hash differ;
   sending a reply from the storage array to the host without the data in the data block stored at the storage array if the first hash and the second hash are the same;
   receiving a read I/O request to read the data block in the storage array;
   determining if data in the data block in the storage array is in a flash cache at the host;
   if the data in the data block is not in the flash cache:
     reading data in the data block in the storage array; and
     updating the flash cache with the data from the storage array;
   if the reply includes data:
     updating the flash cache with the data from the reply; and
     answering the read I/O request with the data from the reply; and
   if the reply does not include data answering the read I/O request with data from the flash cache.

2. The method of claim 1, wherein determining a second hash of the data block stored at the storage array comprises using the same hash algorithm used by the host to determine the first hash.

3. The method of claim 1, further comprising:
   receiving a write I/O request to write data to the storage array; and
   writing the data from the write I/O request to a flash cache.

4. A method, comprising:
   sending a conditional read request from a host to a storage array requesting data in a data block stored at the storage array, the conditional read request comprising a first hash of data in the data block at the host;
   determining a second hash of the data in the data block stored at the storage array;
   comparing the first hash and the second hash;
   sending a reply from the storage array to the host with the data in the data block stored at the storage array if the first hash and the second hash differ;
   sending a reply from the storage array to the host without the data in the data block stored at the storage array if the first hash and the second hash are the same;
   regaining a connection from a host to the storage array;
   marking entries in a cache at the host as non-verified;
   receiving a read I/O request;
   reading data from the storage array if data for the read I/O request is not in the cache;
   updating the flash cache with the data from the storage array if data for the read I/O request is not in the cache;
   determining if the data for the read I/O request is verified if data for the read I/O request is in the cache; and
   reading the data for the read I/O request from the cache if the data at the cache is verified.

5. The method of claim 4 wherein sending a conditional read request comprises sending a conditional read request if the data at the cache is not verified.

6. The method of claim 5, further comprising:
   receiving a reply to the conditional read;
   marking an entry in the cache as verified if the reply does not include data from the data block.

7. The method of claim 6, further comprising, if the reply includes data from the data block:
   updating the cache with the data from the reply; and
   marking the entry in the cache as verified.

8. A method, comprising:
   sending a conditional read request from a host to a storage array requesting data in a data block stored at the storage array, the conditional read request comprising a first hash of data in the data block at the host;
determining a second hash of the data in the data block stored at the storage array;
comparing the first hash and the second hash;
sending a reply from the storage array to the host with the data in the data block stored at the storage array if the first hash and the second hash differ;
sending a reply from the storage array to the host without the data in the data block stored at the storage array if the first hash and the second hash are the same;
recovering a connection with the storage array;
reading a cache directory at the host, the cache directory indicating which data is in a flash cache and validity of the data;
marking entries in the cache directory as non-verified;
receiving a read I/O request;
if data for the read I/O request is not in the cache directory:
    reading data from the storage array; and
    updating the flash cache with the data from the storage array;
determining if the data for the read I/O request is verified if data for the read I/O request is in the cache directory;
reading the data for the read I/O request from the flash cache if the data at the cache directory is verified;
if the data at the cache directory is not verified:
    receiving a reply to the conditional read;
    marking an entry in the cache directory as verified if the reply does not include data from the data block;
    if the reply includes data from the data block:
        updating the cache directory with the data from the reply; and
        marking the entry in the cache directory as verified.

9. A host, comprising:
at least one processor configured to:
    send a conditional read request to a storage array requesting data in a data block stored at the storage array, the conditional read request comprising a first hash of data in the data block at the host;
    receive a reply from the storage array with the data in the data block stored at the storage array if the first hash and a second hash of the data in the data block at the storage array differ;
    receive a reply from the storage array without the data in the data block stored at the storage array if the first hash and the second hash are the same;
    regain a connection to the storage array;
    mark entries in a cache as non-verified;
    receive a read I/O request;
    read data from the storage array if data for the read I/O request is not in the cache;
    update the flash cache with the data from the storage array if data for the read I/O request is not in the cache;
    determine if the data for the read I/O request is verified if data for the read I/O request is in the cache;
    read the data for the read I/O request from the cache if the data at the cache is verified;
    receive a reply to the conditional read;
    mark an entry in the cache as verified if the reply does not include data from the data block;
    if the reply includes data from the data block:
        update the cache with the data from the reply; and
        mark the entry in the cache as verified.

10. The host of claim 9, further comprising circuitry comprising at least one of a memory, programmable logic and logic gates.

11. The host of claim 9, wherein the at least one processor is further configured to determine the first hash using the same hash algorithm used by the storage array to determine the second hash.

12. The host of claim 9, wherein the at least one processor is further configured to:
    recover a connection with the storage array;
    read a cache directory at the host, the cache directory indicating which data is in a flash cache and validity of the data;
    mark entries in the cache directory as non-verified;
    receive a read I/O request;
    if data for the read I/O request is not in the cache directory:
        reading data from the storage array; and
        updating the flash cache with the data from the storage array;
    determine if the data for the read I/O request is verified if data for the read I/O request is in the cache directory;
    read the data for the read I/O request from the cache if the data at the cache directory is verified;
    if the data at the cache directory is not verified:
        receive a reply to the conditional read;
        mark an entry in the cache directory as verified if the reply does not include data from the data block;
    if the reply includes data from the data block:
        update the cache directory with the data from the reply; and
        mark the entry in the cache directory as verified.

13. The host of claim 9, wherein the storage array is accessed by other hosts, and
    wherein the at least one processor is further configured to:
        receive a read I/O request to read the data block in the storage array;
        determine if data in the data block in the storage array is in a flash cache at the host;
        if the data in the data block is not in the flash cache:
            read data in the data block in the storage array; and
            update the flash cache with the data from the storage array;
        if the reply includes data:
            update the flash cache with the data from the reply; and
            answer the read I/O request with the data from the reply; and
        if the reply does not include data answer the read I/O request with data from the flash cache.

14. The host of claim 9 wherein the at least one processor is further configured to:
    receive a write I/O request to write data to the storage array; and
    write the data from the write I/O request to the flash cache.

15. The host of claim 9, wherein the at least one processor configured to determine a second hash of the data block stored at the storage array comprises at least one processor configured to use the same hash algorithm used by the host to determine the first hash.

16. The host of claim 9 wherein the at least one processor configured to send a conditional read request comprises at least one processor configured to send a conditional read request if the data at the cache is not verified.

17. The host of claim 16, wherein the at least one processor is further configured to:
    receive a reply to the conditional read; and
    mark an entry in the cache as verified if the reply does not include data from the data block.

* * * * *